United States Patent [19]

Rathbun

[11] Patent Number: 5,385,014
[45] Date of Patent: Jan. 31, 1995

[54] VALVE AND METHOD OF VALVE USE WHILE WASHING A COMPRESSOR IN AN AIRCRAFT ENGINE

[75] Inventor: Richard T. Rathbun, Piney Flats, Tenn.

[73] Assignee: Aeronautical Accessories, Inc., Bristol, Tenn.

[21] Appl. No.: 126,993

[22] Filed: Sep. 27, 1993

Related U.S. Application Data

[63] Continuation-in-part of Ser. No. 943,915, Sep. 11, 1992, abandoned.

[51] Int. Cl.⁶ .............................................. B08B 9/00
[52] U.S. Cl. ................................... 60/39.02; 60/39.33; 134/22.1; 134/23
[58] Field of Search ............... 60/39.02, 39.33, 39.07; 134/22.1, 22.18, 22.19, 23, 33; 251/297

[56] References Cited

U.S. PATENT DOCUMENTS

| | | |
|---|---|---|
| 2,689,456 | 9/1954 | White . |
| 3,446,425 | 5/1969 | Cleeves . |
| 3,623,668 | 11/1971 | Freid et al. ............. 239/265.17 |
| 3,830,660 | 8/1974 | Ezell .................. 134/23 |
| 4,059,123 | 11/1977 | Bartos et al. ............ 60/39.33 |
| 4,065,322 | 12/1977 | Langford ................ 134/7 |
| 4,170,489 | 10/1979 | Magnus et al. ........... 60/39.33 |
| 5,011,540 | 4/1991 | McDermott ............. 134/23 |
| 5,063,963 | 11/1991 | Smith .................. 137/606 |

Primary Examiner—Richard A. Bertsch
Assistant Examiner—William J. Wicker
Attorney, Agent, or Firm—Jones & Askew

[57] ABSTRACT

The present invention provides a valve for preventing contamination of a fuel management system connected to a pneumatic sense line by closing communication of compressed air from a scroll of the engine through a passageway in the valve to the pneumatic circuitry of the fuel management system. A detent is located on one side of the valve for receiving a raised surface on the knob of the valve and for holding the valve in the open position. A pair of stops on a camming surface separately engage a second pin on the valve to stop a handle of the valve from rotating past the selected open or closed position. The valve has all metal surfaces isolated so it may withstand vibrations. A method of washing a compressor of an aircraft engine is disclosed.

3 Claims, 3 Drawing Sheets

VALVE AND METHOD OF VALVE USE WHILE WASHING A COMPRESSOR IN AN AIRCRAFT ENGINE

CROSS REFERENCE TO RELATED APPLICATION

This is a continuation-in-part of Ser. No. 07/943,915, filed Sep. 11, 1992, now abandoned.

TECHNICAL FIELD

The present invention relates to aircraft engines. More particularly, the present invention relates to a valve for controlling communication through a pneumatic sense line of an aircraft engine and to a method of using the valve for preventing contamination of devices connected to the pneumatic sense line by fluids used to clean a compressor in the aircraft engine.

BACKGROUND OF THE INVENTION

Typical turbine engines for aircraft, such as helicopters, have a compressor, a turbine, a combustion chamber and a fuel management system. The fuel management system adjusts the flow of fuel to the combustion chamber in response to a signal that indicates the revolutions per minute (RPM) at which the engine is operating. For example, as a helicopter begins to take-off from a landing area, the RPM falls from a normal operating RPM because power from the engine is used to move the helicopter. The fuel management system responds by increasing the flow of fuel to the combustion chamber and thereby returns the RPM to normal. Some fuel management systems are operated electrically; others are pneumatic: compressed air is supplied as the power that operates the system. For example, the ALLISON 250-C20 series engine manufactured by General Motors Corporation for use in helicopters is one known engine that uses a pneumatic fuel management system. A pneumatic sense line communicates compressed air from a source, such as the compressor, to the fuel management system. The pneumatic sense line is a metal tube, typically stainless steel, that connects with fittings to a boss on a scroll of the engine. The scroll is a ring-like tube disposed around the output side of the compressor, and the boss is a threaded connector for the pneumatic sense line. Stated in the parlance of the industry, the pneumatic sense lines are pneumatic circuitry that connect to the fuel management system.

The compressor supplies compressed air for use in the combustion chamber. The compressor mounts at a forward portion of the engine and includes a plurality of sets of rotatable and stationary blades. A set of blades is generally referred to as a stage of the compressor. The rotatable blades attach and extend radially outward from a drive shaft and the stationary blades attach to a side wall and extend inwardly. The drive shaft mounts on bearings in the engine and is disposed along the longitudinal axis of the engine. Air enters the intake side of the compressor and passes over and around the blades, while the drive shaft is rotating as discussed below. The blades cooperate to compress the air that passes over the several rotating stages of the compressor. The compressed air exits the compressor and then enters the scroll. A portion of the compressed air flows from the scroll through the pneumatic sense line to the fuel management system. Often the compressed air in the pneumatic sense line is filtered before being communicated to the fuel management system in order to remove particulates and other corrosive materials that are carried in the air through which the aircraft is traveling.

The scroll includes a pair of tubes that extend rearward to communicate the compressed air to the combustion chamber. The compressed air is mixed in the combustion chamber with a combustible fuel and ignited. The resulting burning air/fuel mixture generates gases at high pressures, which gases pass through the turbine and exit through an exhaust. The turbine comprises a plurality of blades that attach and extend radially outwards from a second portion of the drive shaft. The blades often are pitched at an angle to the longitudinal axis of the drive shaft. The force of the gases impacting on the blades cause the drive shaft to rotate at high speed, and thereby turn the compressor blades and a propeller or rotor that attaches at one end of the drive shaft to move the aircraft.

During operation of the aircraft, the fuel management system adjusts the flow of fuel to the combustion chamber. A governor monitors the RPM of the drive shaft in the engine and communicates a signal proportional to the RPM to the fuel management system. In response, the flow of fuel is increased or decreased. For example, a helicopter engine operates at a normal predetermined speed identified as 100% RPM. When the helicopter takes off or moves through the air, the angle of attack for the rotor is changed and additional power is required to maintain the rotor at the 100% RPM. The increased demand for power reduces the RPM of the engine, and in response to the signal from the governor, the fuel management system increases the fuel flow to return the RPM to normal.

The fuel management system includes a body having needles, springs and ports for communicating fuel from a fuel tank to the combustion chamber. The internal body of the fuel management system is primarily aluminum with aluminum parts and castings. The aluminum surfaces are not painted or coated and the aluminum is susceptible to corrosion. The filter discussed above reduces the amount of corrosive materials that pass to the fuel management system, but the corrosive materials that pass through the body attack the aluminum surfaces and create pits thereon as well as leave surface deposits. Corrosion degrades the performance of the fuel management system and may lead to failure of parts in the system. If the fuel management system stops working, or works improperly, fuel will not be supplied to the combustion chamber in the necessary volume to meet the demand for operating the aircraft and the engine may stop operating. This could result in the aircraft crashing.

A bleed valve sense line is another pneumatic sense line typically found on aircraft engines. The bleed valve sense line communicates the static pressure of the compressed air to a bleed valve. The bleed valve opens to release compressed air from the scroll to the atmosphere when the air is compressed to a pressure greater than necessary for the engine to operate. Should the air be excessively compressed, a compressor stall could occur and result in engine shut down. Typically, the air is over compressed only when the aircraft is waiting to takeoff and the engine is operating at 100% RPM. The bleed valve then opens and releases a portion of the compressed air.

Operation of such turbine engines necessarily requires that significant volumes of air pass through the compressor. Such air includes a variety of materials such as dust and dirt particles, smog and other air-borne particulates. For example, coastal areas have high amounts of air-borne salts that are carried into the compressor. During operation of the aircraft engine, such materials tend to deposit and build-up on the blades of the compressor. Over time, such build-up of materials degrades the performance of the compressor and thus degrades the performance of the aircraft engine. Manufacturers of such aircraft engines typically recommend that these materials be routinely washed from the compressor at regular intervals. The blades and the compressor are washed clean with an aqueous solution that is sprayed into the intake side of the compressor. The aqueous solution can be either clean water or a solution of water and a cleaning agent or solvent. For example, the maintenance manual for the ALLISON 250-C20 series engine describes two levels of cleaning procedures for proper maintenance of the compressor. The first cleaning procedure involves rinsing the compressor with the best water available on a daily basis when the engine is operated in a corrosive atmosphere. The second cleaning procedure involves washing the compressor with a solution of an approved aircraft skin cleaner and water. It is suggested that such cleaning is normally required after 200–300 hours of operation in smoggy areas.

The cleaning solution is sprayed into the compressor intake while the engine is motored with the starter without ignition. Preferably, the solution is injected with an aspirator or sprayer equipped with a quick opening valve. It is recommended that the injection start approximately three (3) seconds prior to starter engagement, and the starter is disengaged at ten percent (10%) of the normal operating RPM. Approximately one liter of cleaning solution is injected in about nine to eleven (9–11) seconds, and the engine speed is maintained below ten percent (10%) for the duration of the injection. The injection cycle may be repeated as necessary until the compressor and the blades are cleaned.

When cleaning the compressor with a solvent or other cleaner in the aqueous solution, the bleed valve sense line and the pneumatic sense line first must be disconnected and removed. The fittings are then capped. Removing these lines and capping the fittings prevents the cleaning solution and dislodged materials from entering and contaminating the fuel management system, the bleed valve and the pneumatic sense lines therefor.

Removing the pneumatic sense lines and capping the fittings is a time consuming process. Maintenance personnel working on aircraft engines are highly paid, so the costs for this second cleaning procedure is significantly higher than the costs for the first maintenance procedure. Further, removal and reinstallation of the pneumatic sense lines causes wear on the fittings and the tubes that comprise the pneumatic sense lines. The tube is susceptible to bending, and bends possibly result in cracks, especially beneath the area of the floating ferrule and at the flared ends of the tube. Accordingly, the tube must be carefully inspected for such wear, bends and cracks before the pneumatic sense line is reinstalled. Also, the fittings for the pneumatic sense lines are subject to over-torquing during removal and reinstallation. The pneumatic sense line further may be improperly aligned with the scroll and thereby create a leak at the fitting. Failure to detect such problems with the pneumatic sense line for the fuel management system may lead to failure of this line during operation of the aircraft. As a consequence of such a mechanical failure, the engine would decelerate and could cause an unscheduled landing.

As discussed above, a daily water rinse of the compressor is recommended when operating the engine in a corrosive atmosphere. Often the water rinse is made without disconnecting any of the pneumatic sense lines, in accordance with the procedure specified by the engine manufacturer. The water is sprayed into the rotating compressor as discussed above. The water dislodges materials from the blades, thereby cleaning the compressor. The water droplets with the dislodged materials are carried in the compressed air through the pneumatic sense line and the fuel management system. After completing the rinse, the engine is operated with the igniter on in order to dry the combustion chamber. The compressed air purges the pneumatic sense lines, the fuel management system, and the bleed valve.

The purpose of the daily wash and the cleaning with aircraft skin cleaner is to remove dirt and other materials from the compressor. Without disconnecting the pneumatic sense lines, such materials may accumulate in the pneumatic circuits of the fuel management system and in the bleed valve, which leads to contamination and possible interference with proper operation of the engine. For example, a turbine engine operated in a salt atmosphere, such as in coastal areas, experiences a build-up of salt, among other materials. The wash water spray, as it enters the compressor is clear, but the salt is dissolved and carried with the other materials in the compressor air and water spray through the pneumatic sense line and through the fuel management system. The engine is then operated to dry the combustion chamber and purge the fuel management system. However, crystal deposits may remain in the fuel management system. These salt and other materials are corrosive and begin attacking the smooth surfaces in the fuel management system. However, disconnecting the pneumatic sense lines during the routine daily cleaning increases the wear and tear on the tube that comprises the pneumatic sense line and is time consuming, as discussed above.

Persons operating such aircraft turbine engines accordingly face difficult problems when cleaning the compressor periodically. The cleaning may occur as frequently as each day, but pursuant to manufacturers' recommendations, cleaning occurs at least every 200 to 300 hours of operation. The manufacturer-specified procedure for cleaning with water only on a daily basis permits the flow of water, salt, dirt and other contaminating materials through the fuel management system. This procedure, however, leaves some surface contamination in the pneumatic sense line and in the body of the fuel management system, resulting in corrosion. The alternative manufacturer-specified procedure for cleaning with water and a cleaning agent requires removal of the pneumatic sense line and capping the fittings on the scroll. This procedure increases the wear on the pneumatic sense line, is time consuming, and more expensive than the first maintenance procedure. Persons involved with maintaining such aircraft engines accordingly must accept some contamination and build up in the fuel management system with resulting corrosion, or accept significantly higher maintenance costs and increased wear on the pneumatic sense lines with the attendant risks of failure during operation of the aircraft.

Accordingly, there exists a need in the art for a convenient, reliable apparatus that closes the pneumatic sense lines and isolates the pneumatic circuitry for the engine fuel management system and the compressor bleed valve to avoid contamination thereof during the routine, periodic washes of the compressor.

SUMMARY OF THE INVENTION

Others in the field of aircraft accessories have found solving the above problems difficult. Any apparatus which closes the pneumatic sense lines or the compressor bleed valves must be able to perform safely in its environment. This means the product must be able to withstand the high temperatures generated by a helicopter engine, the high pressure of the air generated by the compressor, and, most of all, must be able to endure the severe vibrations caused by the high revolutions in a helicopter engine. These vibrations can cause a device to be shaken into an unsafe position; for example, the device could be shaken into a condition during operation of the engine where the pneumatic sense line is closed or partially closed. Such a condition could cause an unscheduled landing. Prior to the invention of the present application, no one has been able to develop a device which can address all of these problems. In fact, the only solution the manufacturer has come forward with is substitution of thicker lines for the existing pneumatic sense lines so that the constant removal of the lines due to cleaning would take longer to damage the lines.

The present invention solves the above problems by providing a valve for controlling communication through a pneumatic sense line for an aircraft engine. The valve has all metal surfaces isolated so it may withstand vibrations. Generally described, the valve comprises a valve body with an intake tube and an outlet tube extending outwardly from the valve body. A rotatable stem and a fixed bushing are disposed in a bore through the valve body, and the stem and bushing include a passage therethrough for communication between the intake tube and the outlet tube when the stem is in a first position. The stem further extends into a grommet and is securedly attached to a knob. Rotation of the knob causes the stem to move between the first position and a second position that closes the passage from communicating with the intake tube. The grommet preferably includes one set of detents for engaging a raised surface on the knob and for holding the knob in the open position.

More particularly described, the valve body includes an intake tube that extends outwardly from the valve body and is threaded for connecting to a scroll of an engine. An outlet tube also extends outwardly from the valve body and is threaded for connecting with a pneumatic sense line. A bore extends through the valve body and a stem is disposed in the bore. Preferably, a bushing is located between the stem and the bore. A passage extends through the stem for communication of compressed air from the intake tube to the outlet tube, when the stem is in a first position. The stem further extends into a grommet on the other side of the valve, the grommet being secured by a cap around the stem. A knob is securedly attached to the stem. Rotation of the knob causes the stem to move between the first position and a second position that closes the passage from communicating with the intake tube. The grommet preferably includes one set of detents for engaging raised surfaces on the knob and for holding the knob the open position. The cap is secured to the valve body by four (4) screws that are safety wired to one another.

A disc-like base at one end of the stem closes the bore on the first side of the valve body. A portion of the side-wall of the base defines a camming surface which contacts a pin that extends outwardly from the valve body. The camming surface includes a pair of stops, one of which is at each end of the camming surface. The stops correspond with the two positions for the stem to prevent the stem from being over-rotated past the desired open or closed position for the valve.

As described above, the valve includes at least one detent. The detent receives a raised surface on the knob when the valve is in the open position. This detent is preferably located on the grommet, which is formed from a resilient, vibration and shock absorbing material. The detent is set to engage raised surfaces on the knob, such as a rod extending through the knob. The valve is operated by rotating the knob while the raised surface abuts the resilient material. Such movement causes the stem to rotate and thereby open or close communication through the passage between the intake and the outlet tubes.

The present invention further provides a method of isolating the pneumatic circuitry of an engine fuel management system and a bleed valve from wash fluid contamination during cleaning of the compressor of the engine. Generally described, the method comprises first moving a knob of a valve between the open and the closed positions for the valve. In the first position, the valve is open for communicating compressed air from an intake tube to an outlet tube. The intake tube is connected to a scroll of an engine for receiving compressed air. The outlet tube is connected to a pneumatic sense line which is connected to a fuel management system of the engine. The second position closes the valve by blocking communication between the intake tube and the outlet tube. Wash fluids and materials dislodged from the compressor are carried in the compressed air that flows through the scroll. The closed valve blocks the fluid and the materials from entering the pneumatic sense lines for the engine fuel management system and the bleed valve.

More particularly described, the method comprises turning a knob to remove a raised surface of the knob from a detent. The detent prevents the knob and stem from unintended movement while the valve is in the open position. After extracting the knob from the detent, the knob is rotated from the first position to a second position. In this second position, communication through the valve between an intake tube and an outlet tube is closed. Wash fluids are then sprayed into the compressor which is rotated by the starter of the engine without the igniter on. The wash fluids dislodge materials from the compressor and the blades, which fluids and materials are carried in the compressed air flow through the scroll and into the combustion chamber. The valve is closed so no air, fluids, or other materials enter the fuel management system through the pneumatic sense line. After the compressor is cleaned, the knob is rotated back from the second position to the first position. This opens communication between the intake tube and the outlet tube. The engine is then started to dry the combustion chamber and purge any remaining material from the combustion chamber.

Accordingly, it is an object of the present invention to provide a valve for controlling communication through a pneumatic sense line in an engine.

It is another object of the present invention to provide a valve in which all metal parts are isolated so the valve may absorb vibrations.

It is another object of the present invention to provide a valve connected to a pneumatic sense line, which valve is selectively opened and closed to control communication of compressed air therethrough.

It is another object of the present invention to provide a valve with a knob that is held in a detent to prevent unintended change in the position of the valve.

It is another object of the present invention to provide a method of isolating the pneumatic sense lines for a fuel management system and for a compressor bleed valve during cleaning of a compressor of a turbine engine.

It is another object of the present invention to provide a method of washing a compressor of an engine while preventing contamination of the pneumatic circuitry for the engine.

Still other objects, features and advantages of the present invention will become apparent upon a reading of the following detailed description in conjunction with the drawings and the appended claims.

DETAILED DESCRIPTION OF THE DISCLOSED EMBODIMENTS

Figure 1:
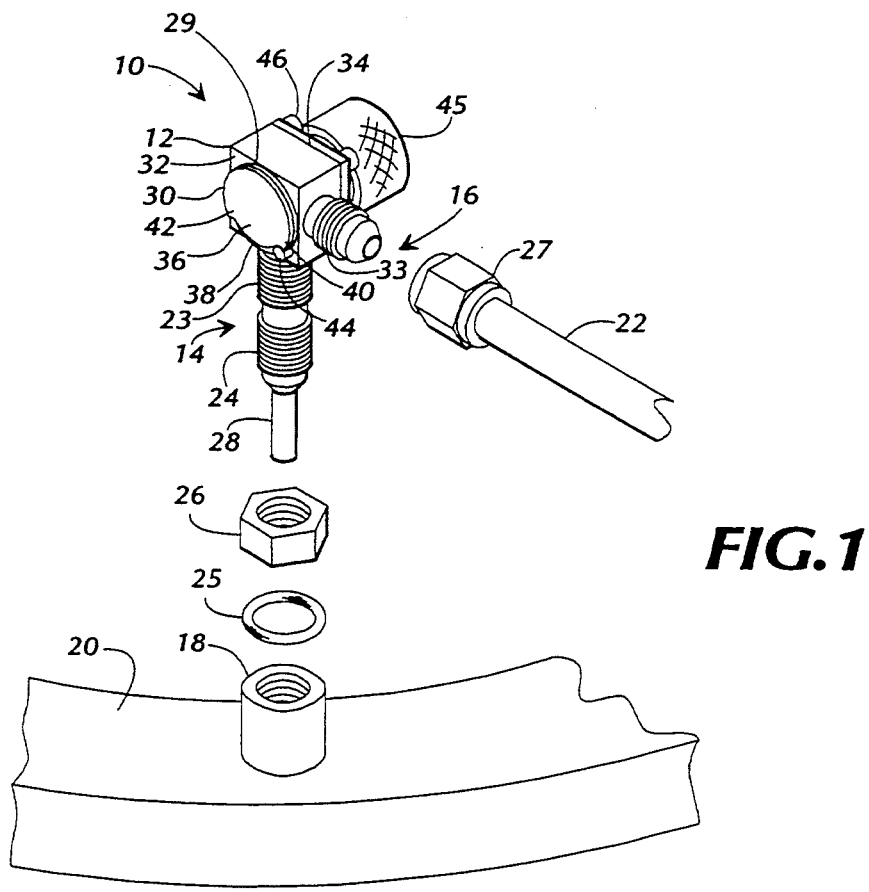
FIG. 1 is a perspective view of a valve constructed in accordance with a preferred embodiment of the present invention, with an engine scroll and a pneumatic sense line exploded therefrom.

Referring now in more detail to the drawings, in which like numerals indicate like parts throughout the several views, FIG. 1 illustrates a perspective view of a valve 10 constructed in accordance with a preferred embodiment of the present invention. The valve 10 includes a valve body 12 with an intake tube 14 and an outlet tube 16 extending therefrom. The intake tube 14 is threaded for joining with a boss 18 on a scroll 20. The scroll 20 is a tube attached to an aircraft engine near the compressor that receives compressed air therefrom for communication to the combustion chamber of the engine. The boss 18 is a threaded tube-like connector attached to the scroll and extending outwardly therefrom. There are two threaded portions 23 and 24 in the intake tube 14, with a gap therebetween. The gap receives an O-ring 25 and a jam nut 26 threads on the portion 23 closer to the valve body 12. The nut 26 on the tube 14 locks the valve 10 to the boss 18 on the scroll 20 and the O-ring 25 makes a seal therebetween. A probe tube 28 attached to the distal end of the intake tube 14 inserts through the boss 18 into the scroll 20. The probe tube 28 receives the compressed air from the scroll 20 for communicating the compressed air to a fuel management system of the aircraft engine. The outlet tube 16 is threaded for connecting the valve 10 to a pneumatic sense line 22. The pneumatic sense line 22 is flared at one end and a nut 27 thereon connects the pneumatic sense line to the threaded portion 33 of the outlet tube 16. The pneumatic sense line 22 connects at a distal end to the fuel management system that controls the flow of fuel to the combustion chamber of the engine. The compressed air communicated through the pneumatic sense line 22 provides the power for operating the fuel management system.

A stem 30 extends through a bushing 29 which in turn extends through a bore 31 in the valve body 12 between a first side 32 of the valve 10 and a second side 34. The portion of the stem 30 within the valve body 12 preferably is circular in cross-section and a disc-like base 36 of the stem 30 is disposed adjacent the first side 32 and defines a cam for rotation of the stem. A camming surface 38 on the base 36 has a first stop 40 and a second stop 42 at the distal ends of the camming surface. A pin 44 extending outwardly from the first side 32 of the valve body 12 contacts and travels on the camming surface 38. The pin 44 separately engages the first stop 40 and the second stop 42 as the stem is rotated in a first direction and a second direction in order to prevent the stem 30 from being rotated beyond the first and second selected positions. The first and second positions correspond to open and closed positions of the stem, respectively.

Figure 5:
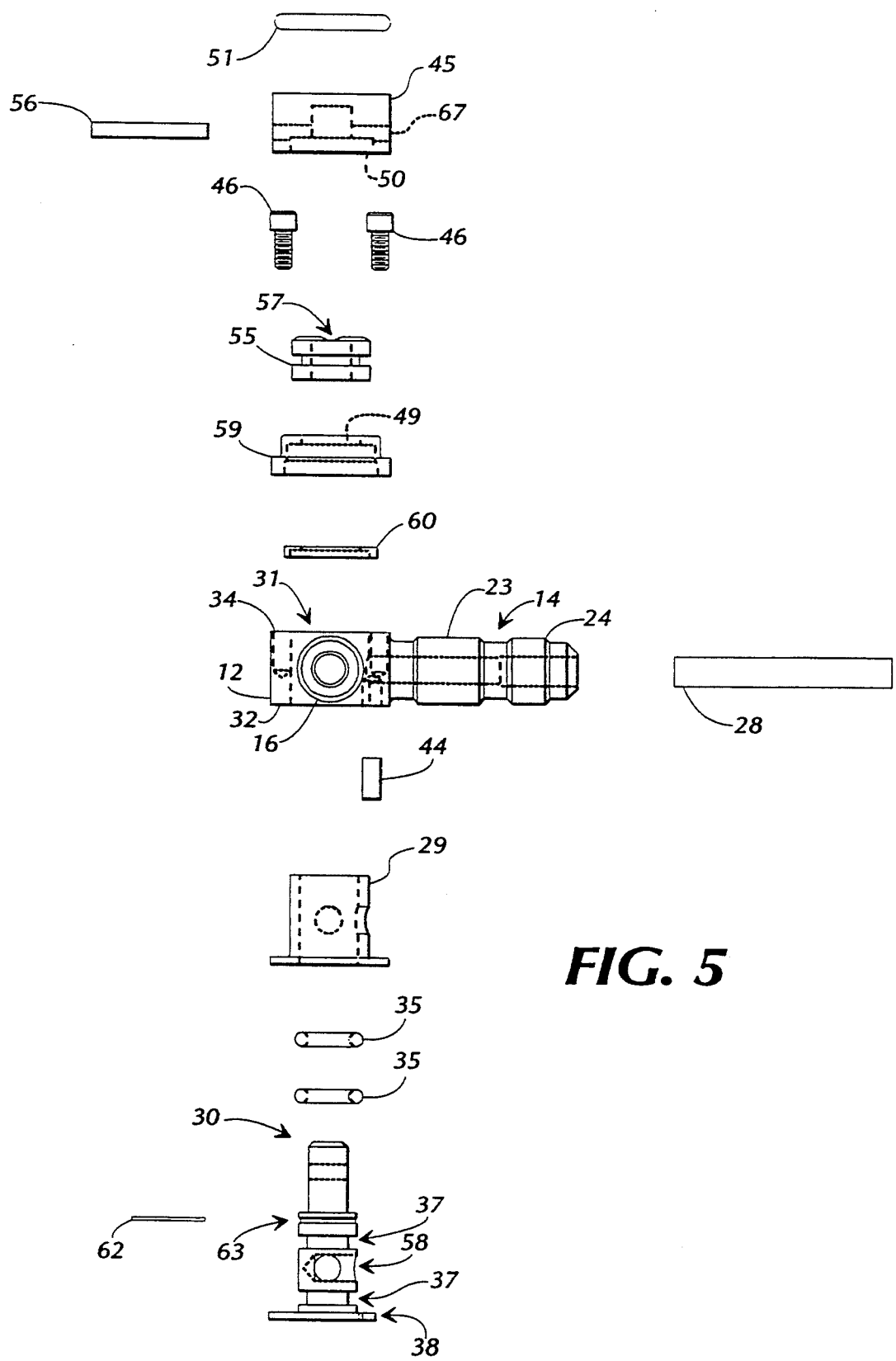
FIG. 5 is an exploded view of the valve of FIG. 1.

A cap 59 is retained to the second side 34 of the valve body 12 by four screws 46. The four screws 46 are secured in place with safety wire 48. The cap 59 includes an annular flange 49 (as seen in FIG. 5) into which fits a grommet 55. This grommet 55 may be formed of any rubber-like or any other shock and vibration absorbing material, but preferably is Viton ® synthetic rubber, by Dupont de Nemours Corp. The grommet 55 fits within a recess 50 on a knob 45. The knob 45 fits on the end of the stem 30 outside the grommet 55 and is held in place by a roll pin 36 which extends through a hole 67 in the knob and through a hole 68 in the stem 30. The grommet 55 includes at least one but preferably two detents 57 at its top for receiving the roll pin 56 when the valve is in the open position, as is described below. An O-ring 51 fits over the outer lip of the cap 59 and abuts the knob 45, as is best seen in FIGS. 1 and 2.

Figure 2:
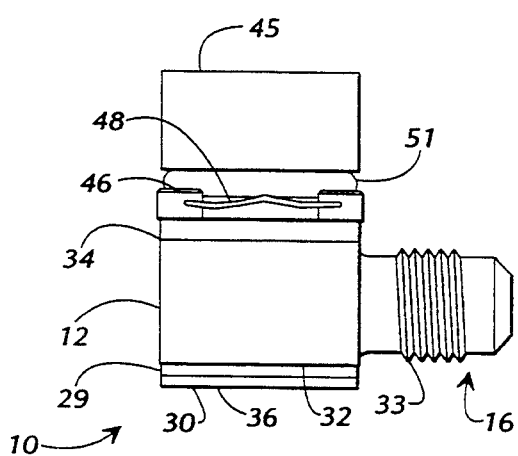
FIG. 2 is a top view of the valve illustrated in FIG. 1.
Figure 3:
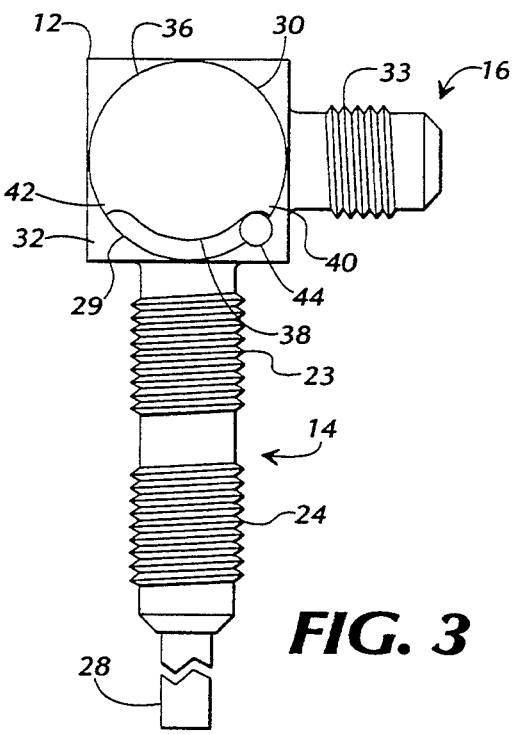
FIG. 3 is a side view of the valve illustrated in FIG. 1.

FIGS. 2 and 3 illustrate the valve 10 in top view and side view, respectively, with the stem 30 disposed in the born 31 of the valve body 12. A pair of O-rings 35 sit in grooves 37 in the stem 30 to seal the ends of the gap between the stem 30 and the bushing 29 at the first and the second sides 32 and 34. The stem 30 includes a passage 58 that communicates between the intake tube 14 and the outlet tube 16 when the stem is in the first position. A washer 60 closes the bore 31 on the second side 34 of the valve body 12. The washer 60 is retained in place by a snap ring 62 disposed in a groove 63 in the stem 30. The roll pin 56 extends through the hole 67 in the knob 45 and the hole 68 in the stem 30 and provides a means by which the rotational force of the knob is applied to the stem 30.

The stem 30 is fabricated as discussed above to form the base 36, the tubular portion having a circular cross-section and the outer portion having the hole 68. The stem 30 preferably is manufactured from a single block of 17-4 PH aircraft quality stainless steel and finished with grinding to an 8 mirror finish. The groove 63 for receiving the snap ring 62 is cut around the circumference of the tubular portion at a predetermined position that will be outside of the valve body 12. The passage 58 is drilled through the tubular portion of the stem 30.

The threaded intake tube 14 and the outlet tube 16 are integral with the valve body 12 which preferably is machined from a single piece of aircraft quality stainless steel, such as 17-4 PH steel. The bore 31 is drilled and the surface is preferably ground to a 16 finish. Bores are drilled through the tubes 14 and 16 into the valve body 12 to the bore 31. The probe tube 28 is attached to the distal end of the intake tube 14. The pin 44 is rigidly connected to the first side 32 of the valve body 12.

Assembly of the valve 10 can best be understood by reference to FIG. 5. The valve 10 is assembled by inserting the O-rings 35 into the grooves 37 in the stem 30. The stem 30 is then inserted into the bushing 29 and then into the bore 31. The stem 30 is oriented so that the passage 58 opens to the intake tube 14 and outlet tube 16. The base 36 is positioned against the first side 32 and the washer 60 is positioned on the stem 30 against the second side 34. The snap ring 62 is then inserted into the groove 63 in the stem 30 to hold the washer 60 in place.

The grommet 55 is then placed inside the annular flange 49 on the cap 59 and the two are placed over the distal end of the stem 30 with the stem 30 extending snugly through the center of the grommet 55. The grommet 55 is situated such that the rod 56 may be located in the open position between the detents 57. The cap 59 is secured to the valve body 12 with the four screws 46 and the four screws are held together with the safety wire 48. The safety wire 48 further secures the cap 59 to the valve body 12.

The knob 45 is placed over the end of the stem 30 so that the recess 50 fits over the end of the grommet 55. The roll pin 56 is then interference-fit through the holes 67 and 68 to hold the knob 45 in place. Finally, the O-ring 51 is placed around the outer flange of the cap 59 against the knob 45 so that it acts as a dust cover between the knob 45 and the cap 59.

The valve 10 is then connected to a turbine engine. The jam nut 26 is threaded onto the intake tube 14 and the O-ring 25 positioned between the threaded portions 23 and 24. The probe tube 28 is inserted through the boss 18 into the scroll 20 and the valve 10 is rotated to connect the intake tube 14 to the boss. The jam nut 26 is turned on the threads of the intake tube 14 to move the jam nut tightly against the boss 18. The jam nut 26 and the O-ring 25 seal the connection between the valve 10 and the boss 18. The pneumatic sense line 22 is then connected to the outlet tube 16 by pushing the flared end against the outlet tube 16 and securing it thereto with the nut 27.

Figure 4:
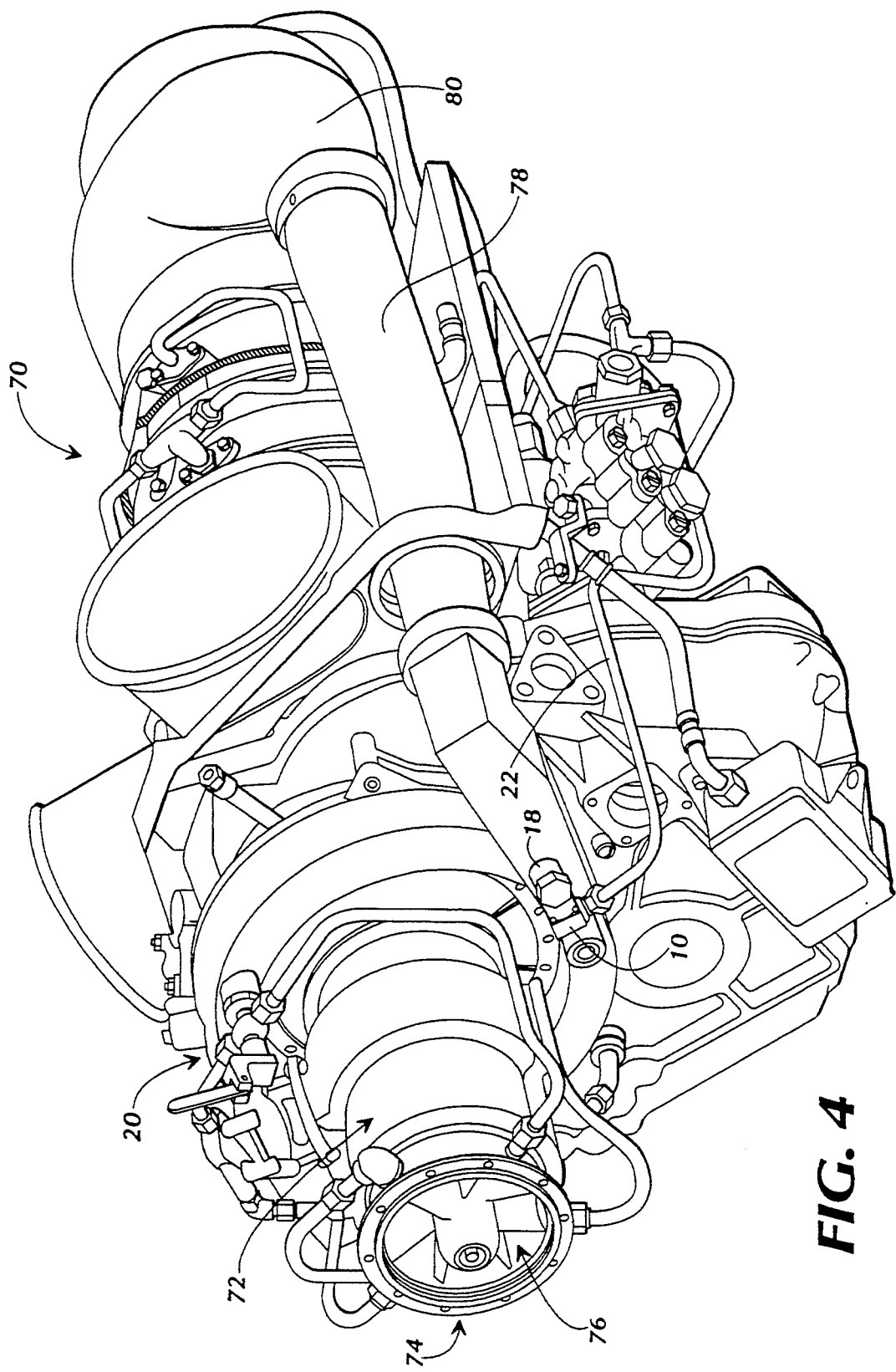
FIG. 4 is a perspective view of an aircraft engine with the valve illustrated in FIG. 1 attached thereto.

FIG. 4 is a perspective view of an aircraft engine 70 with the valve 10 illustrated in FIG. 1 connected between the scroll 20 and the pneumatic sense line 22. The intake tube 14 is threadingly engaged to the boss 18 on the scroll 20, and the outlet tube 16 is connected with the nut 27 to the pneumatic sense line 22. During operation of the turbine engine 70, air enters a compressor 72 through an intake 74 and passes over a plurality of blades 76 whereby the air is compressed. The compressed air enters the scroll 20 for communication through a tube 78 to a combustion chamber 80 at the rear of the engine 70.

The compressed air includes a variety of materials, such as dust and dirt particles, salt, smog and other air pollution particulates. These materials deposit and build-up on the blades 76 of the compressor 72 during operation of the aircraft engine 70. The materials that collect on the blades and in the compressor degrade the performance of the compressor and must be periodically cleaned from the compressor.

The compressor is washed as recommended by the manufacturer to remove these materials and to maintain efficient performance of the engine. The compressor 72 is washed by spraying an aqueous solution into the compressor intake 74 while the drive shaft of the engine is rotated by operating the starter without the igniter. Before the washing is accomplished, the valve 10 is first closed to prevent fluid communication through the pneumatic sense line 22 into the fuel management system of the engine 70. To operate the valve, the knob 45 is simply turned so that the rod 56 pops out of the detents 57 in the grommet 55. The turning of the knob 45 continues so that the stem 30 is rotated from the first to the second position (or closed valve position), and the rotation stops when the pin 44 engages the second stop 42 thereby preventing the stem from rotating beyond the selected second position.

With the stem 30 in the second position, communication of compressed air from the scroll 20 to the pneumatic sense line 22 is prevented because the passage 58 in the stem 30 is rotated out of communication with the intake tube 14. The stem 30 presents a closed face to the intake tube 14.

Cleaning of the engine 70 as discussed above may then proceed. The igniter for the combustion chamber is switched off. The starter for the engine 70 is operated to rotate the drive shaft and thereby rotate the blades 76 in the compressor 72. The selected aqueous solution is sprayed into the compressor intake 74 while the engine is motored with the starter without ignition. The starter is disengaged at a relatively low speed, approximately ten percent (10%), of the normal operating speed for the engine. Approximately one liter of cleaning solution is injected in approximately nine to eleven seconds with the engine speed maintained below ten percent (10%) for the duration of the injection. The injection of cleaning solution may then be repeated as necessary until the compressor blades 76 are clean.

With the pneumatic sense line 22 between the scroll 20 and the fuel management system closed, the wash water and materials dislodged from the compressor blades 76 flow with the compressed air from the compressor 72 through the scroll 20 and the tubes 78 to the combustion chamber. Such fluids are evaporated and the dislodged material purged from the combustion chamber 80 when the engine 70 is started and operated after the cleaning procedure is complete.

When the cleaning procedure is completed, the valve 10 is operated to move the knob 45 and stem 30 to the first position and thereby re-establishes communication between the scroll 20 and the fluid management system. In this position, the passage 58 communicates with the intake tube 14 and the outlet tube 16. The pin 44 contacts the first stop 40 to stop the rotation of the stem 30. The knob 45 is then secured in the first position for communication of compressed air from the scroll 20 to the fuel management system. The pressure between the grommet 55 and the knob 45, the shock and vibration absorbing quality of the grommet and the location of the rod 56 in the detents 57 prevents the valve from being vibrated to the closed position.

The present invention disclosed herein provides a valve for controlling communication through the pneumatic sense line of the turbine engine and provides a method of isolating the pneumatic circuitry of the fuel management system of the engine from contamination by fluids and debris material washed from the compressor during cleaning thereof. As may be appreciated, equipment added to aircraft engines, and procedures related to that equipment, must have a high degree of reliability. Because of the excessive revolutions per minute at which a helicopter engine operates, it is essential the valve be able to withstand a large amount of vibration without shifting positions or slipping to the closed position during operation. To accommodate these vibrations, the invention in this application has avoided metal-to-metal contact between moving parts by designing a valve with the vibration and shock absorbing parts of grommet 55, O-rings 35, and O-ring 51. These resilient parts work to absorb the vibrational energy which is imparted to the valve. Further, the valve provides a pair of stops on the camming surface to prevent the stem from being over-rotated beyond the selected open or closed position.

A valve manufactured in accordance with the disclosure herein underwent start and operation tests on an ALLISON 250-C20 turbine engine of a helicopter. In the test engine, a pair of the valves were connected to the pneumatic sense line for the fuel management system and to the pneumatic sense line for the bleed valve. The start-up and the run-up performance of the engine were tested to determine the behavior of the engine in the event that both valves are inadvertently left closed and in the event that just the valve for the fuel management system is left closed. The tests involved starting the engine and accelerating the RPM towards the engine's normal 100% operating RPM. Such pre-flight checks of the engine RPM are routinely made by pilots. Under these test conditions for the valve, it was determined that the engine will fail to accelerate during the start cycle and that the RPM will hang at approximately forty percent (40%) of the normal operating RPM. This creates an indication to the pilot that there is a problem with the engine. As a result, the flight of the helicopter is prevented when the valve in the pneumatic sense line for the fuel management system is left in the closed position.

Also tested was the event of leaving the valve closed in the pneumatic sense line for the bleed valve. It was determined that the engine will start normally and accelerate to take-off power levels, but with an increase in turbine-out temperature (TOT) of approximately fifty degrees centigrade (50°) at the take-off power level. Such condition should not create problems during operation of the aircraft. It is believed that at higher ambient temperatures, such as ninety degrees Fahrenheit (90° F.) or above, the TOT display will reflect an increased temperature when the aircraft is carrying a maximum total gross weight. At lighter weights or cooler ambient temperatures, this subtle TOT increase will most likely not be observed nor be a problem.

It was noted that minor compressor surges were experienced during the throttle down transient which would provide obvious indications of a closed sense line for the bleed valve. However, the throttle movement from open to ground idle typically occurs at the conclusion rather than initiation of flight.

No adverse engine operating characteristics were experienced during the collective (power-on) or down (power-off) trials with the valve closed in the pneumatic sense line for the bleed valve. Flight operations with the bleed valve sense line closed therefore will be identical to a mechanically failed-open bleed valve or a pneumatic sense line left inadvertently capped after performing a compressor wash using the previous cleaning procedures.

The principles, preferred embodiments and modes of operation of the present invention have been described in the foregoing specification. The invention is not to be construed as limited to the particular forms disclosed, because these am regarded as illustrative rather than restrictive. Moreover, variations and changes may be made by those skilled in the art without departing from the spirit of the invention as set forth by the following claims.

What is claimed is:

1. A method of isolating pneumatic circuitry in an engine fuel system from wash fluid contamination during cleaning of the compressor of the engine, comprising:

moving a knob of a valve from a first open position where a raised surface of the knob rests in a detent, the open position for communicating compressed air from an intake tube connected to a scroll of the engine through the valve to an outlet tube, to a second closed position, the second position for blocking communication there between;

the detent or the knob comprising a shock and vibration absorbing material;

whereby wash fluids and materials dislodged from the compressor and carried in an air flow through the scroll are blocked from entering the engine fuel system.

2. A method of washing a compressor of an engine, comprising:

moving a knob of a valve from a first open position where a raised surface of the knob rests in a detent, the open position for communicating compressed air from an intake tube connected to a scroll of engine through the valve to an outlet tube, to a second closed position, the second position for blocking communication there between;

the detent or the knob comprising a shock and vibration absorbing material;

spraying a cleaning solution into an intake of the compressor while motoring the engine with the starter without ignition to clean material from the compressor and the turbine; and moving the knob from the second closed position to the first open position and back to rest in the detent, whereby the fuel management system, being blocked from communicating with the scroll, is not contaminated with the cleaning solution and material dislodged during cleaning.

3. The method as recited in Claim 2 wherein the valve further comprises shock and vibration absorbing material between all movable parts so that the valve is capable of absorbing vibrations from the engine.

* * * * *